(12) United States Patent
Demene et al.

(10) Patent No.: US 12,507,987 B2
(45) Date of Patent: Dec. 30, 2025

(54) ULTRASOUND PROBE HOLDING DEVICES FOR INFANTS

(71) Applicants: ICONEUS, Antony (FR); INSERM (INSTITUT NATIONAL DE LA SANTÉ ET DE LA RECHERCHE MÉDICALE), Paris (FR); Centre National de la Recherche Scientifique, Paris (FR); ECOLE SUPERIEURE DE PHYSIQUE ET DE CHIMIE INDUSTRIELLES DE LA VILLE DE PARIS, Paris (FR)

(72) Inventors: Charlie Demene, Paris (FR); Bruno-Felix Osmanski, Paris (FR);

(Continued)

(73) Assignees: ICONEUS, Antony (FR); INSERM (INSTITUT NATIONAL DE LA SANTÉ ET DE LA RECHERCHE MÉDICALE), Paris (FR); Centre National de la Recherche Scientifique, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 190 days.

(21) Appl. No.: 18/267,387

(22) PCT Filed: Dec. 13, 2021

(86) PCT No.: PCT/EP2021/085545
§ 371 (c)(1),
(2) Date: Jun. 14, 2023

(87) PCT Pub. No.: WO2022/128948
PCT Pub. Date: Jun. 23, 2022

(65) Prior Publication Data
US 2024/0057969 A1    Feb. 22, 2024

(30) Foreign Application Priority Data

Dec. 14, 2020 (EP) .................................... 20306562

(51) Int. Cl.
*A61B 8/00* (2006.01)
*A61B 5/00* (2006.01)
(Continued)

(52) U.S. Cl.
CPC ............ *A61B 8/4227* (2013.01); *A61B 5/256* (2021.01); *A61B 5/291* (2021.01); *A61B 5/6814* (2013.01);
(Continued)

(58) Field of Classification Search
CPC ....... A61B 8/4227; A61B 5/256; A61B 5/291; A61B 8/0808; A61B 8/4281;
(Continued)

(56) References Cited

U.S. PATENT DOCUMENTS

2011/0196238 A1\* 8/2011 Jacobson ............. A61B 8/4227
600/459
2016/0030001 A1\* 2/2016 Stein ........................ A61B 8/06
600/431
(Continued)

FOREIGN PATENT DOCUMENTS

DE          4003603  A1 \*  9/1990
DE          9405271  U1     8/1994
(Continued)

OTHER PUBLICATIONS

DE4003603 Translation (Year: 1990).\*
(Continued)

*Primary Examiner* — Adil Partap S Virk
(74) *Attorney, Agent, or Firm* — Osha Bergman Watanabe & Burton LLP

(57) ABSTRACT

An ultrasound probe holding device configured to attach to the head of an infant for transfontanellar imaging is dis-
(Continued)

closed, including a head pad configured to be in contact with the head of the infant and including a central opening, wherein the head pad is configured to receive an ultrasound probe; a pad squeezer, including a central opening and configured to cooperate with the head pad to allow an axial guidance of the head pad along a guidance axis substantially perpendicular to a surface tangent to the head of the infant; a device holder configured to be attached to the head of the infant and exert a downward force on the pad squeezer, along said guidance axis; and a repellent configured to exert a repellent force between the pad squeezer and the head pad when the device holder exerts the downward force on the pad squeezer.

18 Claims, 6 Drawing Sheets

(72) Inventors: Mickael Tanter, Paris (FR); Jérôme Baranger, Paris (FR); Olivier Baud, Paris (FR)

(51) Int. Cl.
*A61B 5/256* (2021.01)
*A61B 5/291* (2021.01)
*A61B 8/08* (2006.01)

(52) U.S. Cl.
CPC .......... *A61B 8/0808* (2013.01); *A61B 8/4281* (2013.01); *A61B 2503/04* (2013.01)

(58) Field of Classification Search
CPC .............. A61B 2503/04; A61B 5/0042; A61B 5/6814; A61B 5/386; A61B 8/4272; A61B 8/0816; A61B 8/4411; A61B 8/4461; A61B 8/483; A61B 8/488; A61B 5/369; A61B 8/0866; A61B 8/4209; A61B 8/0875
See application file for complete search history.

(56) References Cited

U.S. PATENT DOCUMENTS

| | | | |
|---|---|---|---|
| 2018/0021021 A1 | 1/2018 | Zwierstra et al. | |
| 2018/0177487 A1* | 6/2018 | Deffieux | A61B 8/4461 |
| 2018/0263597 A1* | 9/2018 | Tchang | A61B 90/50 |
| 2020/0281526 A1 | 9/2020 | Carpenter et al. | |
| 2021/0361975 A1* | 11/2021 | Schafer | A61N 7/00 |

FOREIGN PATENT DOCUMENTS

| | | |
|---|---|---|
| JP | 2018517513 A | 7/2018 |
| JP | 2018521828 A | 8/2018 |
| WO | 2019155226 A1 | 8/2019 |

OTHER PUBLICATIONS

Shiogai et al., "Brain tissue perfusion monitoring using Sonopod for transcranial color duplex sonography", 2012 (Year: 2012).*
International Search Report issued in PCT/EP2021/085545 on Mar. 30, 2022 (5 pages).
Written Opinion of the International Searching Authority issued in PCT/EP2021/085545 on Mar. 30, 2022 (10 pages).
Demene, C. et al.; "Functional Ultrsound Imaging of the Brain Activity in Human Neonates"; IEEE International Ultrasonics Symposium (IUS) Sep. 18, 2016 (3 pages).
Tanter, M. et al.; "Ultrafast Imaging in Biomedical Ultrasound"; IEE Transactions on Ultrasonics, Ferroelectrics, and Frequency Control, vol. 61, No. 1, Jan. 2014, pp. 102-119 (18 pages).
Mace, E. et al.; "Functional Ultrasound Imaging of the Brain: Theory and Basic Principles"; IEEE Transactions on Ultrasonics, Ferroelectrics, and Frequency Control, vol. 60, No. 3, Mar. 2013, pp. 492-506 (15 pages).
Office Action issued in Japanese Patent Application No. 2023-559164, mailed on Aug. 5, 2025 (6 pages).

* cited by examiner

ULTRASOUND PROBE HOLDING DEVICES FOR INFANTS

TECHNICAL FIELD OF THE INVENTION

The present disclosure relates to ultrasound probe holding devices for infants and more specifically devices configured to attach to the head of the infant for transfontanellar imaging. The present disclosure further relates to ultrasound devices including such ultrasound probe holding devices and ultrasound imaging systems and methods for brain imaging of infants using such ultrasound devices. The present disclosure more specifically relates to ultrasound imaging systems and methods using such ultrasound devices for brain functional ultrasound imaging (fUS) of infants.

BACKGROUND OF THE INVENTION

The clinical management of infants and the understanding of neuro-developmental disorders is limited by the absence of an effective and efficient imaging modality to evaluate early brain function. Functional magnetic resonance imaging (fMRI) is one the best techniques available for adult brain imaging but it is very complex to implement for neonates as its use at the bedside for brain imaging of vulnerable infants is especially challenging. In clinics, near-infrared spectroscopy (NIRS) or electroencephalography (EEG) are mainly used, two techniques with low spatial resolution and an activity measurement limited to the surface of the brain. Therefore, there is a need for a clinical neonatal cerebral functional imaging modality, efficient and easy to use, and for the development of portable innovative approaches that would allow for the real-time monitoring of brain function in infants.

Recently (See M. Tanter et al., "*ultrafast imaging in biomedical ultrasound*", IEEE, Trans. Ultrason. Ferroelecr. Freq. Control 61, 102-119 (2014)), ultrafast ultrasound imaging was introduced to achieve more than 10,000 ultrasound frames per second (compared to the typical 50 frames per second used in conventional ultrasound scanners). In the ultrafast Doppler (UfD) imaging mode (See for example E. Mace et al., "*Functional ultrasound imaging of the brain: Theory and basic principles*", IEEE, Trans. Ultrason. Ferroelecr. Freq. Control 60, 492-506 (2013)), up to a 50-fold increase in sensitivity for blood flow measurements in the human brain is obtained. Unlike conventional Doppler techniques, which are limited to the imaging of large vessels, UfD imaging enables the mapping of subtle hemodynamic changes in small brain vessels, i.e. with diameters smaller than 200 µm.

Functional ultrasound imaging (fUSI) leverages these blood flow maps to image brain activity according to neurovascular coupling that correlates local neural activity and relative changes in cerebral blood volume (CBV). By providing real-time images of deep brain activity with high spatiotemporal resolution, fUSI enables for example imaging of brain activity during epileptic events recorded by electroencephalography (EEG). fUSI also enables the mapping of functional brain "connectivity", i.e. the measurement of the brain activity when the brain is at rest.

As fUSI studies fluctuations in cerebral blood volume (CBV), its feasibility depends on the ability to observe the same imaging region during the whole time of acquisition, i.e. for durations of the order of the minute or even ten minutes. This is particularly important in the case of the mapping of functional brain connectivity where the patient is examined at rest, in the absence of external stimulation. As a matter of fact, the results are based on the correlations between the CBV signals from different areas of the brain. It is thus essential that the imaging region remains static.

For the first preclinical experiments in small animals, this was made possible by fixing the probe in a 3D printed mold, mounted on a motorized system, allowing it to be positioned in a plane of interest and to keep it in place throughout the acquisition. The rat or mouse was immobilized by a stereotaxic frame. In more recent experiments, metal, plexiglass or dental cement supports surgically implanted directly on the skull of the animal were developed, the probe then attaching to this frame with magnets or screws. For the intraoperative proof of concept in humans, the patient's head was locked in a stereotaxic frame, and the probe held by an articulated mechanical arm. In all these configurations, the skull was open or surgically thinned.

All these methods thus have in common that they are invasive and involve surgery. They are obviously inapplicable to infants.

In addition, although some functional imaging techniques such as fMRI have no other choice than to immobilize infants with straps, it is still desirable to constrain them as little as possible. Techniques aimed at preventing head movements should therefore be avoided as much as possible. This is especially true in the case of premature babies who need to be placed in an incubator to complete their development. Devices for monitoring heart rate, respiration and blood oxygen saturation are also added, as well as possibly syringe pumps to administer food and appropriate treatments.

These strong constraints both on the patient's fragility and on his immediate environment make it necessary to design an ultrasound probe holding device configured to attach to the head of the infant that may be usable in an incubator with the existing equipment, that doesn't hinder the movements of the infant, and that ensure the ultrasound probe stability during acquisition, typically for a duration of ten minutes.

The published utility model DE 94 05 271 U describes a device, or head mount, for receiving a sonographic probe for setting and fixing it on the skull of an infant with a holding device which can be attached to the latter and on which the measuring probe rests adjustably in a probe bearing.

In a recent publication (See C. Demene et al., "*Functional ultrasound imaging of brain activity in human newborns*", Sci. Transl. Med. 9, eaah6756 (2017)), it was reported a customized flexible and non-invasive head mount for real time functional ultrasound imaging of a newborn brain. More specifically, it was demonstrated that fUSI is feasible by ultrafast Doppler (UfD) imaging of the brain microvasculature, further combined with simultaneous continuous video-electroencephalography (EEG) recording and. To avoid motion artifacts usually encountered while manually handling the probe, a new ultrasound probe holding device was designed. The ultrasound probe was inserted into a semirigid biocompatible silicon head mount enabling a single-plan pivot, which was filled with ultrasound gel. This device was held together with EEG electrodes using soft non adhesive strips. This simple system has shown a very good robustness and first results of fUSI on newborns were obtained.

However, head mounts of the prior art have shown some drawbacks that limit their use. In particular, such head mounts can slide on the head skin, and the acoustic gel can leak out of the head mount. This has the effect of degrading the quality of the image, and rendering unusable any EEG electrodes used simultaneously. In addition, the installation of the device is tedious and can hardly be done alone.

The present disclosure relates to an ultrasound probe holding device configured to attach to the head of an infant, that ensures a very good stability of the ultrasound probe during acquisition, while enabling an easy installation and limiting the pressure exerted on the head of the infant.

SUMMARY

In what follows, the term "comprise" is synonym of (means the same as) "include" and "contains", is inclusive and open, and does not exclude other non-recited elements. Moreover, in the present disclosure, when referring to a numerical value, the terms "about" and "substantially" are synonyms of (mean the same as) a range comprised between 80% and 120%, preferably between 90% and 110%, of the numerical value.

According to a first aspect, the present disclosure relates to an ultrasound probe holding device configured to attach to the head of an infant for transfontanellar imaging, comprising:
 a head pad configured to be in contact with the infant head and comprising a central opening, wherein the head pad is configured to receive an ultrasound probe;
 a pad squeezer, comprising a central opening and configured to cooperate with the head pad to allow an axial guidance of the head pad along a guidance axis substantially orthogonal to a surface tangent to the head of the infant;
 a device holder configured to be attached to the head of the infant and exert a downward force on the pad squeezer, along said guidance axis; and
 repellent means configured to exert a repellent force between the pad squeezer and the head pad when the device holder exerts the downward force on the pad squeezer.

An infant in the present description is a young child typically below 12 months of age, before the fontanel closes and therefore for which transfontanellar imaging is possible. It includes premature and full-term neonates.

The applicant has shown that such original arrangement of the ultrasound probe holding device according to the present description enables to finely adjust the pressure applied to the head of the infant, thanks to the repellent force exerted between the pad squeezer and the head pad when the device holder exerts the downward force on the pad squeezer.

The ultrasound probe holding device may be configured to attach to the head of an infant for transfontanellar imaging through any fontanel of the head of the infant, i.e. the anterior fontanel, the posterior fontanel, the sphenoid fontanels or the mastoid fontanels.

According to one or further embodiments, the repellent force has an amplitude which increases non-linearly with a distance between the head pad and the pad squeezer defined along said guidance axis. This enables to further limit the pressure exerted on the head of the infant. In some embodiments, the repellent force results in a configuration where, in operation, there is no or almost no contact in the direction of the guidance axis between the pad squeezer and the head pad.

According to one or further embodiments, the amplitude of the repellent force is such that the resulting pressure exerted on the head of the infant by the head pad ranges from around 1 kPa to around 500 kPa (1 kPa=1000 N/m$^2$), more advantageously from around 10 kPa to around 100 kPa. The pressure exerted on the head of the infant should be large enough to produce a sufficient stiction but not too large to keep the infant comfortable.

According to one or further embodiments, the axial guidance of the head pad along said guidance axis has a lateral mechanical backlash, enabling a relative movement between the pad squeezer and the head pad in a plane substantially perpendicular to the guidance axis. Such lateral backlash enables the possibility for the infant to slightly move his head while a stiction (i.e. a static friction) is preserved between the head pas and the head, thanks to the force exerted by the device holder.

According to one or further embodiments, such lateral mechanical backlash is smaller than around 4 mm.

According to one or further embodiments, such lateral mechanical backlash is greater than around 0.5 mm.

According to one or further embodiments, the repellent means comprise repellent magnets arranged respectively on the head pad and on the pad squeezer. The applicant has shown that repellent magnets are compatible with a lateral mechanical backlash of the axial guidance. Further, magnets enable exerting a repellent force whose amplitude increases nonlinearly with a distance between the head pad and the pad squeezer, along the guidance axis.

However, other repellent means are possible, e.g. repellent springs, cushioning material such as foam, cushion with elastic walls and liquid filling, cushion with gas filling.

According to one or further embodiments, a surface of the head pad configured to be in contact with the infant head is curved to adapt to the shape of the head. This enables an easy installation on the infant head, a distribution of the pad pressure over a large area of skin, and important stiction. For example, said curved surface has curvatures different in two perpendicular planes, typically coronal/sagittal planes. Such curvature may be chosen according to the age of the infant and its particular anatomy, so that using the device at different age only implies to choose the adapted head pad among a predefined panel, the other components remaining unchanged.

According to one or further embodiments, the surface of the head pad configured to be in contact with the infant head has a square section or a round section. The square section may prevent the rotation around the guidance axis of the head pad/or probe, for imaging preferentially in coronal/parasagittal sections, while the round section may enable imaging any section.

According to one or further embodiments, the device holder comprises a flexible material harness attached to the pad squeezer. Such flexible material may be fabric or plastic. In some embodiments, said harness may be removably attached to the pad squeezer, for example attached to hinged tabs of the pad squeezer. In other embodiments, said harness and the pad squeezer may be made in one piece.

According to one or further embodiments, the device holder is configured to attach electrodes for electroencephalography. This enables electroencephalography imaging in addition to ultrasound imaging.

According to one or further embodiments, the ultrasound probe holding device further comprises a probe holder configured to receive an ultrasound probe, wherein said probe holder is fastened to the head pad.

According to one or further embodiments, the probe holder is removably fastened to the head pad. For example, the probe holder is removably fastened to the head pad using magnets. When fastened to the head pas, the probe holder should be strongly fixed to avoid any possible move.

According to one or further embodiments, the probe holder and the head pad may also be made in one piece.

According to one or further embodiments, when the probe holder is removably fastened to the head pad, the probe holder can be fastened to the head pad in at least two positions, said at least two positions resulting from a rotation around an axis parallel to the guidance axis. For example, the probe holder can be fastened to the head pad in two positions resulting from a 90° rotation. It enables, in operation, imaging different planes in the brain, for example coronal and sagittal sections.

According to one or further embodiments, the probe holder can be mounted rotatable in the head pad, around an axis parallel to the guidance axis.

According to a second aspect, the present disclosure relates to an ultrasound device for transfontanellar imaging of an infant, comprising:
- an ultrasound probe holding device according to the first aspect;
- an ultrasound probe configured to be mounted in said head pad, wherein the ultrasound probe is configured to emit ultrasound waves towards the brain of the infant and receive backscattered ultrasound waves.

According to one or further embodiments, the ultrasound probe can be rotated around a rotation axis substantially perpendicular to said guidance axis.

According to one or further embodiments, the ultrasound probe can be rotated around a rotation axis substantially parallel to said guidance axis.

According to one or further embodiments, the ultrasound probe holding device comprises a probe holder and the ultrasound probe is configured to be removably fastened to said probe holder.

According to one or further embodiments, the ultrasound probe comprises a matrix of transducers and said matrix of transducers is rotatable around an axis substantially perpendicular to said guidance axis and/or is rotatable around an axis substantially parallel to said guidance axis.

According to a third aspect, the present disclosure relates to an ultrasound imaging system for transfontanellar imaging of an infant comprising:
- an ultrasound device according to the second aspect;
- an electronic module configured to receive electrical signals transmitted by the ultrasound probe and generate converted signals, wherein said electrical signals result from the detection of the backscattered ultrasound waves;
- a computer configured to receive the converted signals from said electronic module and calculate imaging data from said converted signals.

According to a fourth aspect, the present disclosure relates to a method for ultrasound brain imaging of an infant using the ultrasound imaging system of the third aspect, comprising:
- positioning the head pad on the head of the infant;
- filling a cavity formed by the opening of the head pad with an ultrasound gel;
- fastening the ultrasound probe on the head pad so that the ultrasound probe is in ultrasonic contact with a fontanel of the infant;
- positioning the pad squeezer to enable said axial guidance of the head pad along said guidance axis, wherein said guidance axis is substantially perpendicular to a surface tangent to the head of the infant;
- applying a downward force on the pad squeezer along said guidance axis, using said holding device;
- emitting ultrasound waves and detecting backscattered ultrasound waves using the ultrasound probe for transfontanellar imaging.

In the method according to the present description, the downward force applied on the pad squeezer along the guidance axis using the holding device enables a stiction (i.e. static friction) between the head of the infant and the head pad, thus limiting any move of the head pad, while keeping a controlled pressure on the head of the infant thanks to the repellent means of the ultrasound probe holding device.

According to one or further embodiments, the method further comprises adjusting the position of the head pad to adjust the field of view of the ultrasound probe. Such step may be made by acquisition of ultrasound images prior to applying the downward force on the pad squeezer using the holding device.

According to one or further embodiments, the method further comprises rotating the ultrasound probe around an axis substantially perpendicular to said guidance axis to image different tilted planes of the brain.

According to one or further embodiments, the method further comprises rotating the ultrasound probe around an axis substantially parallel to said guidance axis from at least one first position to a second position in order to image tilted coronal and sagittal sections of the brain.

According to one or further embodiments, the method further comprises electroencephalographic measurements using electroencephalographic electrodes arranged on said holding device.

BRIEF DESCRIPTION OF DRAWINGS

Other advantages and features of the invention will become apparent on reading the description, illustrated by the following figures which represent.

DETAILED DESCRIPTION

Figure 1A:
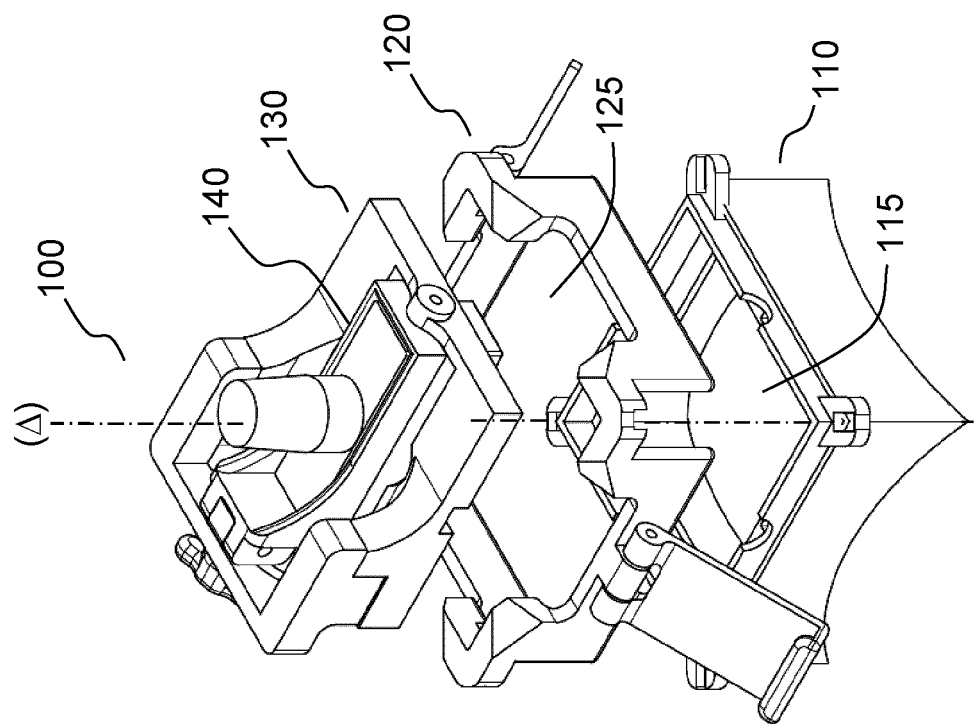
FIGS. 1A and 1B illustrate respectively third quarter right and third quarter left exploded views of an ultrasound device according to an embodiment of the present description.
Figure 1B:
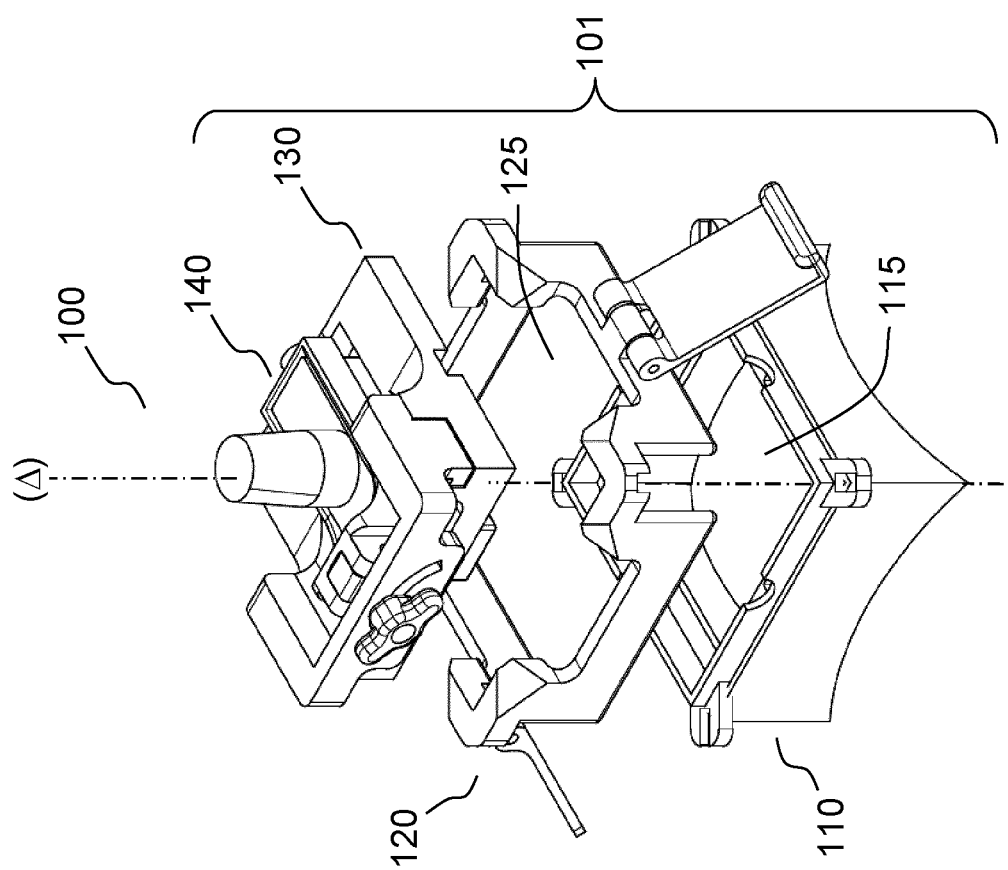

FIGS. 1A and 1B illustrate respectively third quarter right and third quarter left exploded views of an ultrasound device 100 according to an embodiment of the present description.

The ultrasound device 100 in the example of FIGS. 1A, 1B comprises an ultrasound probe 140 configured to emit ultrasound waves towards the brain of the infant and receive backscattered ultrasound waves and an ultrasound probe holding device 101 comprising a head pad 110 and a pad squeezer 120. The head pad 110 is configured to be in contact with the head of the infant and comprises a central opening 115. The pad squeezer 120 comprises a central opening 125 and is configured to cooperate with the head pad 110 to allow an axial guidance of the head pad along a guidance axis A. In operation, the guidance axis A is substantially perpendicular to a surface tangent to the head of the infant. As it is described in greater details below, the ultrasound probe holding device further comprises a device holder (not shown in FIGS. 1A, 1B) configured to be attached to the head of the infant and to exert a downward force on the pad squeezer, along the guidance axis A. In the example of FIGS. 1A, 1B, the ultrasound probe holding device 101 further comprises a probe holder 130 configured to receive the ultrasound probe 140, wherein said probe holder is configured to be fastened to the head pad 110.

According to some embodiments, the axial guidance of the head pad along said guidance axis has a lateral mechanical backlash, enabling a relative movement between the pad squeezer and the head pad in a plane substantially perpendicular to the guidance axis. For example, the lateral mechanical backlash is smaller than around 4 mm and greater than around 0.5 mm. Such lateral backlash enables the possibility for the infant to slightly move his head while a stiction (i.e. a static friction) is preserved between the head pas and the head, thanks to the force exerted by the device holder.

FIGS. 2A, 2B, 2C and 2D illustrate respectively exploded views, top view and side view of details of the head pad 110 and the pad squeezer 120 of the ultrasound probe holding device 101 illustrated in FIGS. 1A, 1B.

Figure 3:
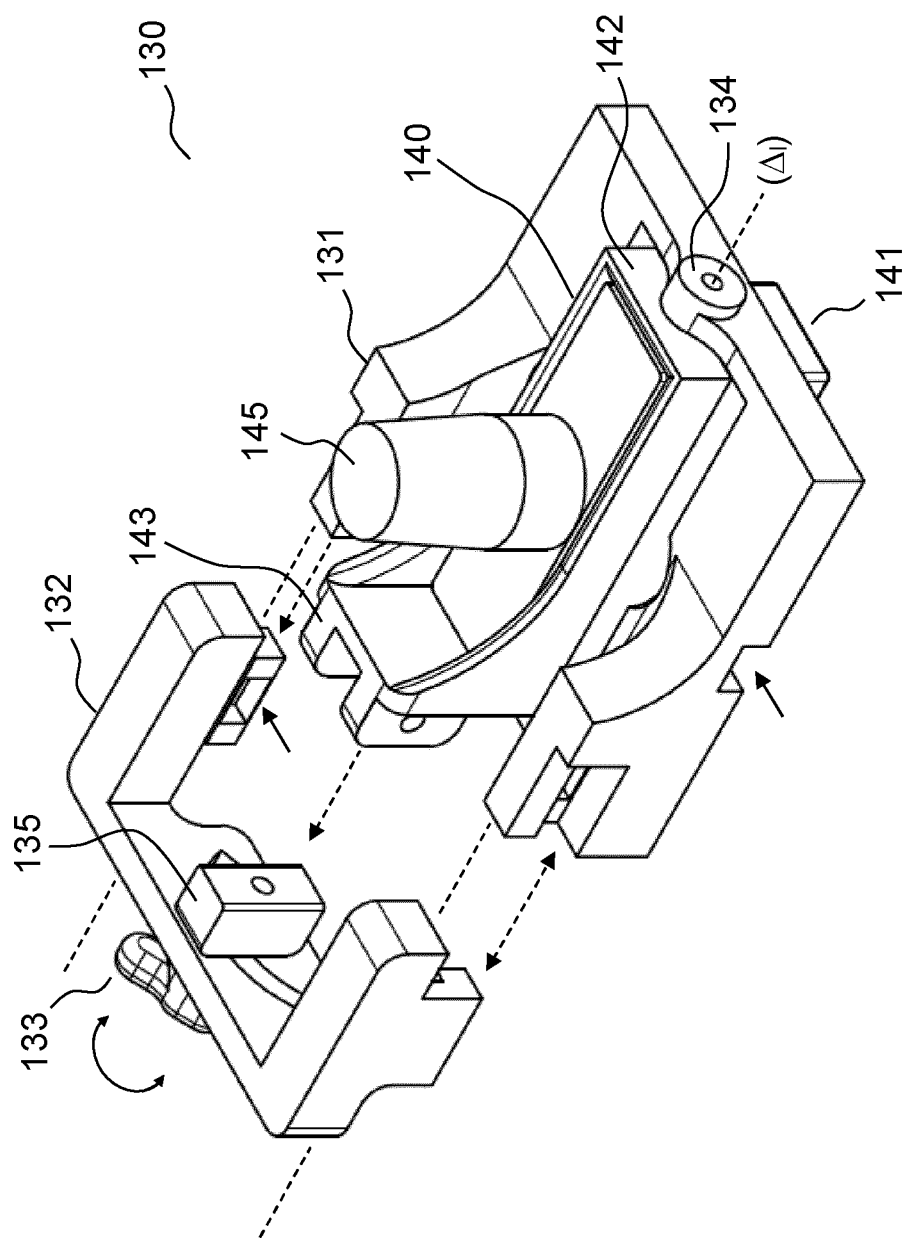
FIG. 3, illustrates an exploded view of an embodiment of a probe holder in an ultrasound device according to an embodiment of the present description.

FIG. 3 illustrates an exploded view of the probe holder 130 as shown in FIGS. 1A, 1B.

Figure 4A:
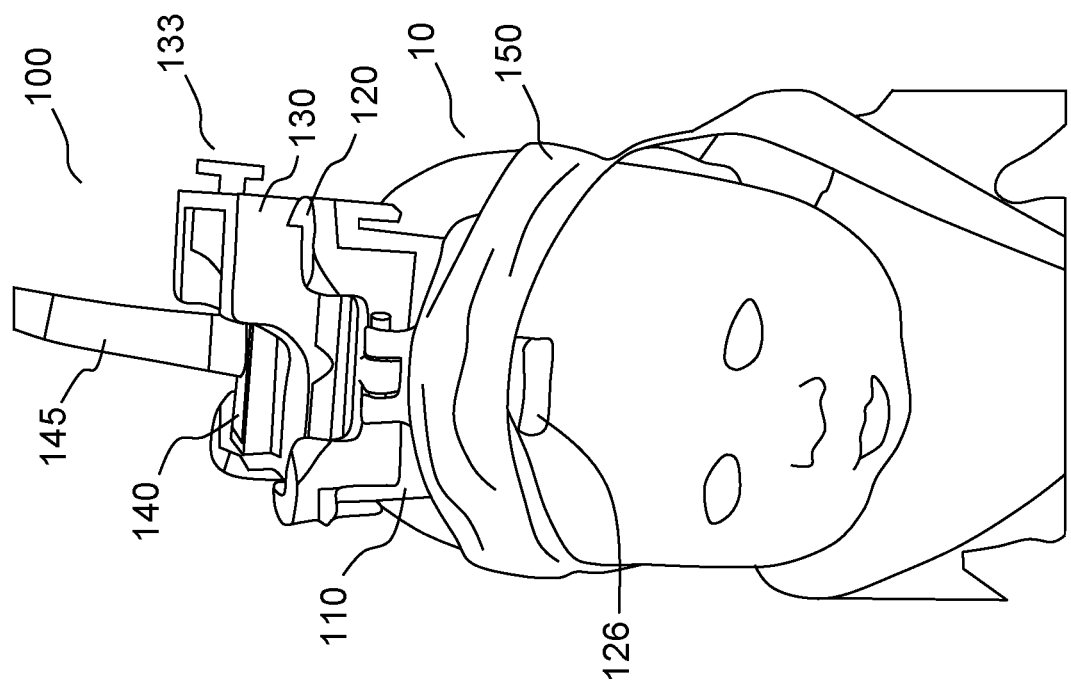
FIGS. 4A and 4B illustrate views of an ultrasound device as shown in FIGS. 1A and 1B arranged on the head of an infant, in an embodiment of the present description.
Figure 4B:
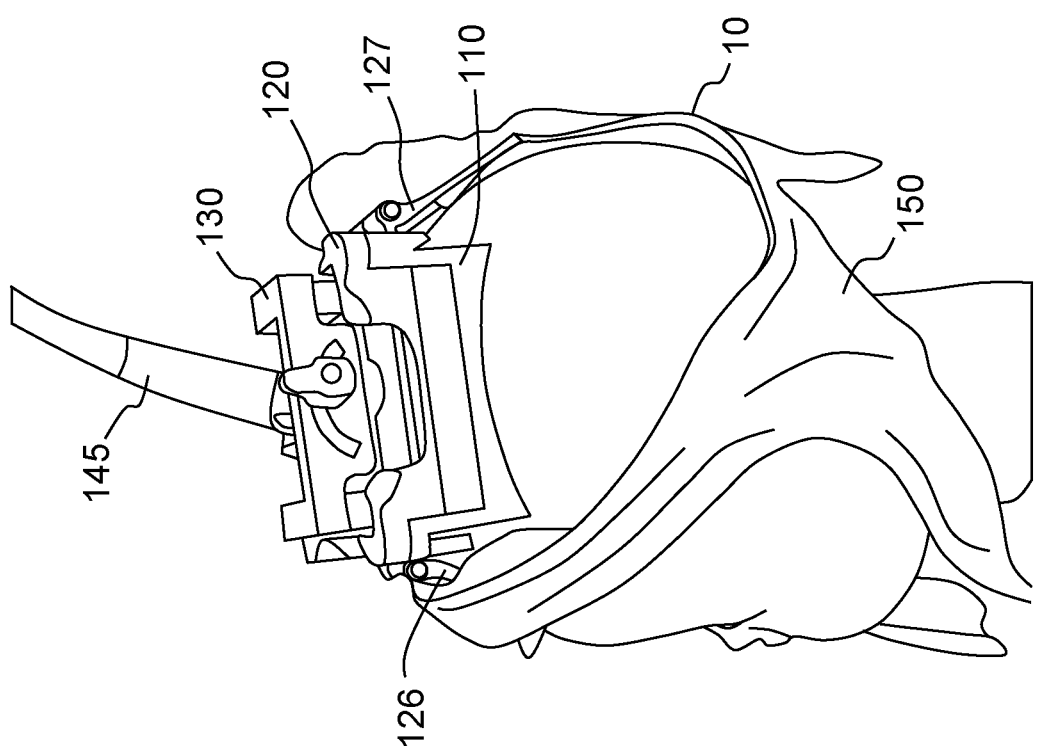
Figure 5:
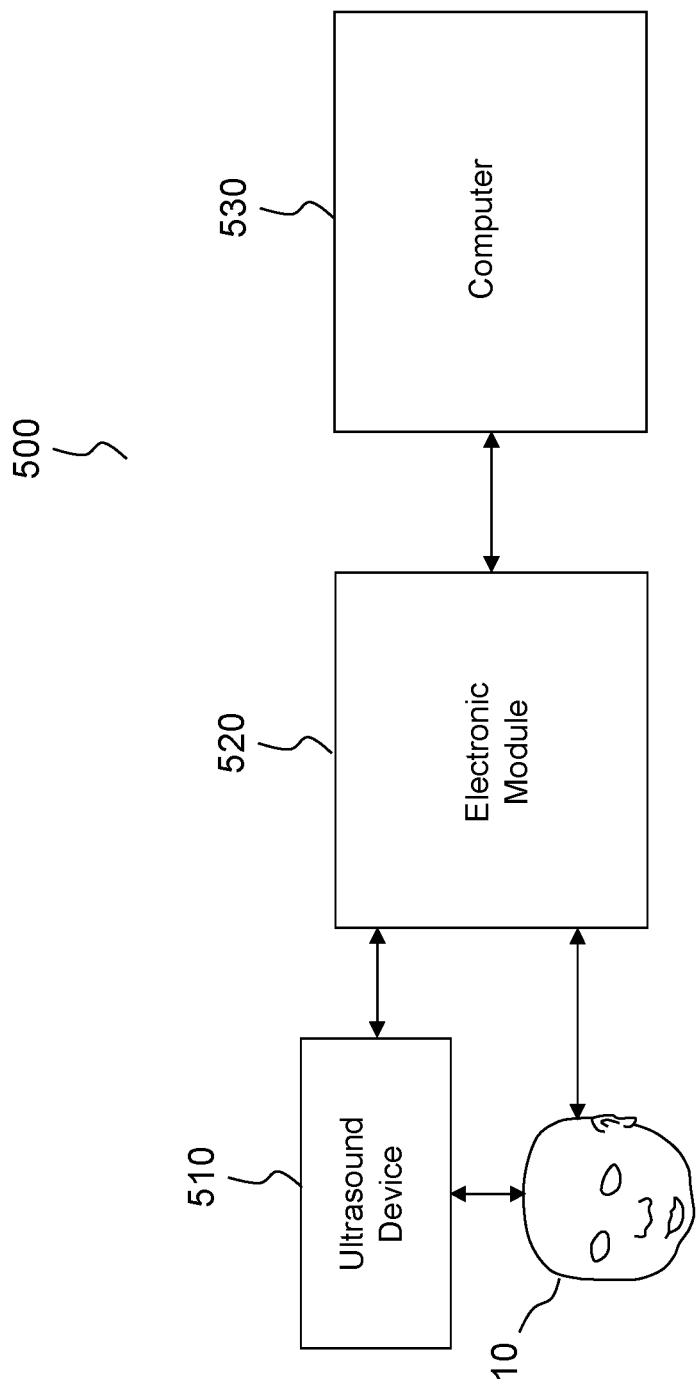
FIG. 5 illustrates an ultrasound imaging system for transfontanellar imaging of an infant implementing an ultrasound device according to the present description.

FIGS. 4A and 4B illustrate two different views of an ultrasound device 100 as shown in FIGS. 1A and 1B arranged on the head 10 of an infant using a device holder 150 and FIG. 5 illustrates an ultrasound imaging system 500 for transfontanellar imaging using an ultrasound device according to the present description.

The ultrasound imaging system of FIG. 5 comprises an ultrasound device 510 according to the present description, with an ultrasound probe configured to emit ultrasound waves towards the brain of the infant 10 and receive backscattered ultrasound waves. It further comprises an electronic module 520 configured to receive electrical signals transmitted by the ultrasound probe 140 and generate converted signals, wherein said electrical signals result from the detection of the backscattered ultrasound waves, and a computer 530 configured to receive the converted signals from said electronic module and calculate imaging data from said converted signals.

As further described in details below, in the embodiments illustrated in FIGS. 1A, 1B, 2A-2D and 3, the ultrasound probe 140 is removable from the probe holder 130 and the probe holder 130 is removably fastened to the head pad 110. However, in some embodiments not shown in the figures, the probe holder 130 and the head pad 110 may form a single piece. In other words, the ultrasound probe 140 may be directly mounted on the head pad 110 configured as the probe holder. Further, the ultrasound probe 140 may be fixed to the probe holder, while still movable in rotation, as explained in details below.

Figure 2B:
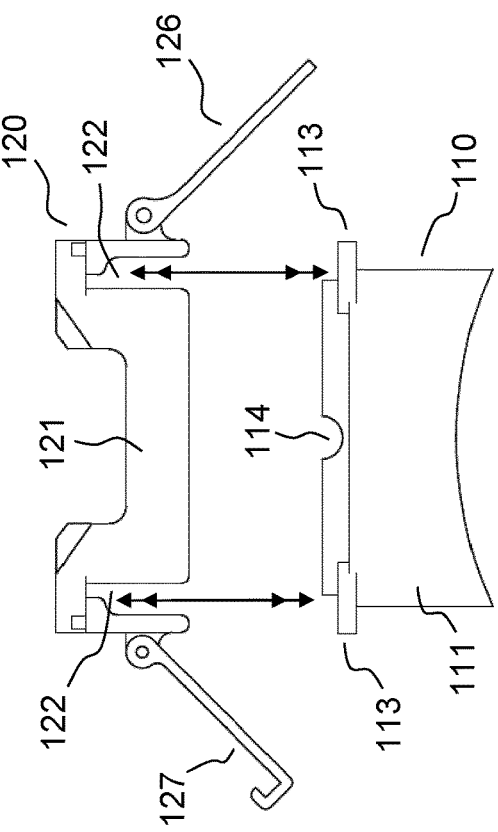
FIGS. 2A, 2B, 2C and 2D illustrate respectively exploded views, top view and side view of an embodiment of a head pad in an ultrasound device according to an embodiment of the present description.
Figure 2D:
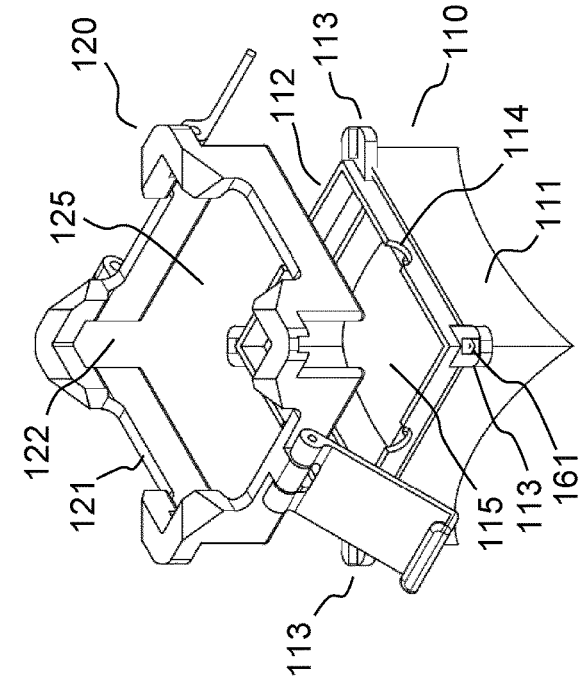
Figure 2A:
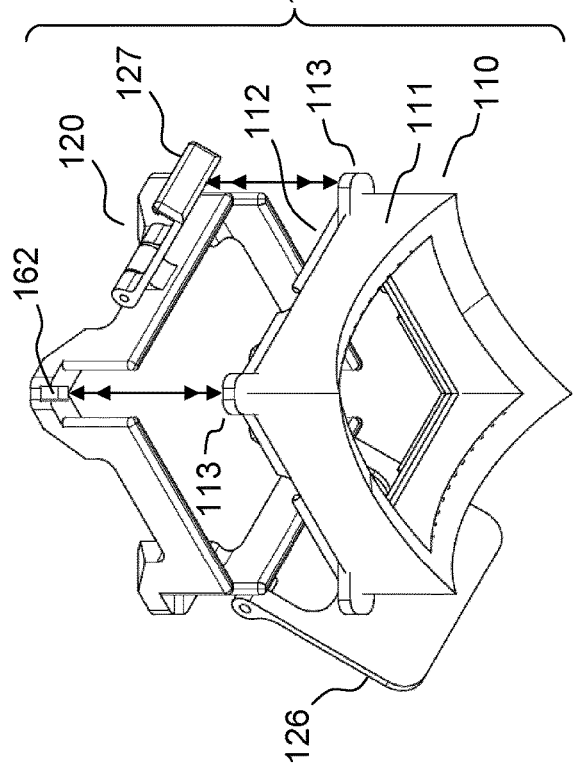

As shown in FIGS. 2A, 2B, the ultrasound probe holding device 101 further comprises repellent means configured to exert a repellent force between the pad squeezer 120 and the head pad 110 when the device holder 150 (not shown) exerts a downward force on the pad squeezer 120. In the present description, a downward force is understood as a force exerted along the guidance axis, towards the head of the infant.

Figure 2C:
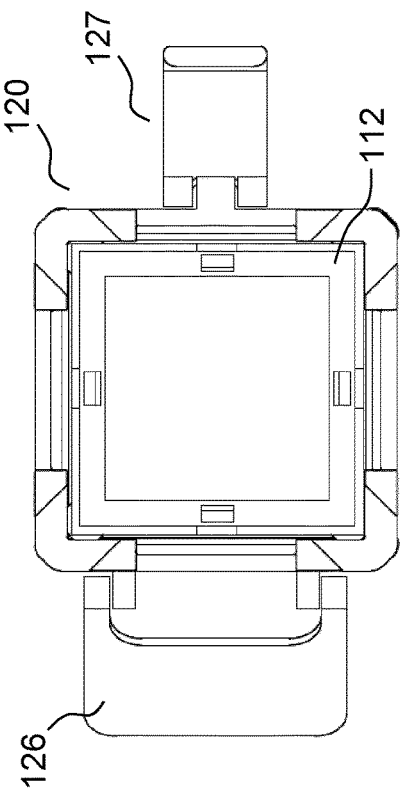

For example, the repellent means comprise repellent magnets 161, 162 arranged respectively on the head pad 110 and on the pad squeezer 120. More specifically, in the example of FIGS. 2A, 2B, the head pad is provided with a plurality of repellent magnets, 4 in this example. Each magnet 161 is in this example arranged in a protrusion 113 to cooperate with the corresponding repellent magnet 162 fitted in a slot 122 of the pad squeezer 120. For example, the poles of the magnets 162 of the pad squeezer 120 are oriented so as to repel out the magnets 161 of the head pad 110, as illustrated in FIGS. 2A, 2C with the double arrows. The magnets 161 and 162 therefore act as compressed springs and tend to move the pad squeezer 120 away from the head pad 110. Thus, the more the pad squeezer 120 is pressed on the head pad 110, the more the head pad 110 is pressed against the skull of the infant.

The use of magnets as repellent means enables exerting a repellent force having an amplitude which increases non-linearly with a distance between the head pad and the pad squeezer defined along said guidance axis. Such distance is for example defined between each of the magnets 161 and 162. This enables to further limit the pressure exerted on the head of the infant. Practically speaking, the magnets may be configured to prevent any direct contact between the head pad and the pad squeezer, along the guidance axis. This consideration enables to perfectly control the pressure exerted on the head of the infant. This, combined with the backlash between the pad squeezer and the head pad, also enable substantial motion of the pad squeezer 120 in a plane perpendicular to the guidance axis while maintaining the pressure exerted by the head pad 110 on the head of the infant. This consideration enables to maintain the head pad 110 and the probe holder 130 in a fixed position on the head of the infant, regardless of motion of the pad squeezer 120 and/or the device holder 150, for example due to the motion of the infant head.

Of course, magnets could be replaced by other known repellent means such as springs or a cushioning material.

As explained before, in the example of FIGS. 1A, 1B, the head pad 110 and the probe holder 130 form two separate parts. This configuration facilitates the installation and particularly the provision of the ultrasonic gel in operation. The head pad 110 is configured to be attached to the head of the infant and to receive, in operation, the ultrasonic gel in the cavity formed by the opening 115 and the skin of the head (not shown). As shown in FIGS. 2A, 2B, the head pad 110 may comprise a 3D printed plastic support 112, to which a silicone pad 111 is attached. The head pad 110 may be attached to the probe holder 130 with magnets (not shown).

As shown in FIG. 2A, the shape of the head pad 110 may be suitable for most infants. The surface of the head pad configured to be in contact with the infant head may be curved and the curvature of said surface may be different in the sagittal and coronal directions, the skull of the infant being not spherical but rather ovoid. The data of two radii of curvature therefore makes it possible to generate as many geometries as necessary to adapt to all anatomies. For a given curvature, a counter-mold may be 3D printed, taking in hollow the desired shape of the head pad.

In the embodiments shown in FIGS. 1A, 1B and 2A-2D, the different pieces of the holding device have a square section. Obviously, the description is not limited to a square shape and the head pad 110 and/or the pad squeezer 120 may have different shapes, for example round sections. All embodiments described in the present description may apply indifferently for different shapes of the head pad and/or the pad squeezer.

As detailed below, in order to secure the head pad 110 to the infant's head, a pad squeezer 120 is positioned over the head pad. As shown in the figures, the pad squeezer 120 may comprise a frame 121 with articulated tabs 126, 127 configured to rest for example respectively on the forehead and occiput, as shown in FIG. 4A, 4B.

As shown in FIG. 4A, 4B, the pad squeezer 120 is attached to the head via a device holder 150, for example a harness. The harness may comprise a flexible material, such as fabric or plastic. In the example shown in FIG. 4A, 4B, the harness 150 comprises straps that pass through the hinged tabs 126, 127 of the pad squeezer 120 and attach to it, for example with fastener strips, such as Velcro® strips. In some embodiments however, the harness and the pad squeezer may be made in one piece. As previously explained, the use of repellent magnets as described above can apply the necessary force to the head pad 110 to keep it in place, regardless of the tension of the harness straps.

FIG. 3 illustrates in more details a non-limitative example of a probe holder 130 configured to hold an ultrasound probe 140. In this embodiment, the probe holder 130 is independent of the head pad 110.

In the example shown in FIG. 3, the ultrasound probe 140 comprises ultrasonic transducers arranged in a matrix 141, for example a linear matrix, an electric probe cable 145 shown in part in FIG. 3, a strapping 142, said strapping being articulated along an axis Δ1, perpendicular to the guidance axis. The strapping 142 comprises in this example a mortise 143 configured to receive a tenon 135 of a rotation blocker module 132 of the probe holder. The probe holder 130 further comprises a body 131. The rotation blocker module 132 may be fixed to the body 131 by sliding in two rails along the axes indicated in dashes in FIG. 3 and magnetized to the body of the probe holder. Plain arrows indicate the positions of the magnets. The probe holder 130 may further comprise a locking crank 133 fitted with a screw inserted into the tenon 135, and sliding in an arcuate rail. The crank 133 makes it possible to tighten the screw, which then firmly places the tenon on the body of the module and thus prevent rotation of the probe.

In the embodiment shown in FIG. 3, the rotation blocker module 132 has been designed to be easily replaced. The rail and magnet system enables module exchanges to be made directly in the patient's room.

A probe motorization system could also be designed and the manual rotation of the probe replaced with an electronically controlled rotation, using for example a servomotor. Such electronically controlled rotation could facilitate ultrasound tomography. As a matter of fact, by acquiring plane by plane B-Mode and Doppler images, it will become possible to reconstruct a 3D volume from these acquisitions.

Alternatively, an ultrasonic probe including a rotatable matrix of transducers may be used for acquisition of the plane by plane B-Mode and Doppler images.

A procedure for installing an ultrasound probe using an ultrasound probe holding device according to the present description is greatly simplified.

First, a head pad 110 for example as shown in FIG. 1A, 1B may be placed on the fontanel of the infant. FIGS. 4A, 4B illustrate transfontanellar imaging through the anterior fontanel; however, transfontanellar imaging may be performed through any fontanel of the infant. Then the pad squeezer 120 is positioned as well as the harness 150 (FIG. 4A, 4B), thus placing the head pad 110 on the head 10 of the infant. The skin of the head together with the head pad 110 forms a sealed cavity which can then be filled with ultrasound gel. The probe holder 130 as for example described in FIG. 3 may then be fixed to the head pad using for example magnets fitted in the inner part of the head pad 110; the head pad 110 may thus be adjusted to accommodate the probe holder 130 with as little play as possible. The ultrasound probe 140 can then be tilted around the axis Δ1 (FIG. 3) to image the desired plane. If necessary, by adjusting the pad squeezer 120 and the straps of the holder 150, everything can be manually shifted slightly in order to properly center the probe on the fontanel.

In the example shown in FIGS. 1A, 1B, the possibility of detaching the probe holder 130 from the head pad 110 allows to add gel if necessary, without changing the position of the head pad 110. In addition, the double curvature of the head pad allows a good seal of the gel reservoir, which allows for example to simultaneously use an electroencephalogram and bring the electrodes as close as possible to the head pad without risk to create electrical bridges between the electrodes via the gel. Further, an attachment of the pad squeezer using a harness as shown in FIG. 4A, 4B is very quick to implement, such harnesses being available in different sizes to best adapt to the infant's morphology. The total weight of an ultrasound device 100 as shown in FIG. 4A, 4B may be less than around 50 g.

The ultrasound probe holding device has been designed in a modular fashion making it possible to improve the fixation of the pad squeezer 120 without touching the head pad 110. Further, the compactness of the ultrasound device is improved.

The ultrasound probe holding device according to the present description has made it possible to significantly increase the quality of the ultrasound images, and to achieve long recordings of up to 20 minutes.

Using an ultrasound imaging system as shown in FIG. 5 with an ultrasound device as described in the present description, first studies on the infant's sleep phases were carried out. Sequence formed by the repetition of a basic block were performed, wherein each block consists of an ultrafast Doppler acquisition composed of three plane waves tilted at [−3°, 0°, 3°], emitted with a pulse repetition frequency of 1800 Hz, and resulting on a framerate of 600 Hz. These plane waves are emitted during 570 ms, allowing acquisition of 342 images with a depth of 30 mm. A break of 430 ms is then made in order to leave time for the transfer of the data, their beamforming and their saving on a hard disk. This basic block therefore has a total duration of 1 s. The effective transmission time of 570 ms was selected to enable registration of at least one cardiac cycle, infants having a heartbeat of 120 beats per minute. This basic block is repeated for 20 min, which ultimately gives a film of 1200 Power Doppler images with a rate of 1 Hz.

After the installation of the ultrasound probe holding device, electroencephalography (EEG) electrodes may be installed on the scalp of the infant, at the locations remaining available on the skin. Those electrodes may also be part of the device holder, and installed in the same time than the ultrasound probe holding device is secured to the head of the infant. EEG electrodes may then be connected to an EEG recorder for joint EEG-fUSI recording combining ultrafast Doppler (UD) imaging of the brain microvasculature and simultaneous continuous video-electroencephalography (EEG) recording.

While the invention has been described with respect to a limited number of embodiments, those skilled in the art, having benefit of this disclosure, will appreciate that other embodiments can be devised which do not depart from the spirit of the invention as disclosed herein. Accordingly, the scope of the invention should be limited only by the attached claims.

The invention claimed is:

1. An ultrasound probe holding device configured to attach to a head of an infant for transfontanellar imaging, comprising:
    a head pad configured to be in contact with the head of the infant and comprising a central opening, wherein the head pad is configured to receive an ultrasound probe;
    a pad squeezer, positioned over the head pad, comprising a central opening and configured to cooperate with the head pad to allow an axial guidance of the head pad along a guidance axis substantially perpendicular to a surface tangent to the head of the infant;
    a device holder configured to be attached to the head of the infant and exert a downward force on the pad squeezer, along said guidance axis, towards the head of the infant; and
    a repellent arranged on at least one of the head pad and the pad squeezer and configured to exert a repellent force between the pad squeezer and the head pad when the device holder exerts the downward force on the pad squeezer.

2. The ultrasound probe holding device as claimed in claim 1, wherein the repellent comprises repellent magnets arranged respectively on the head pad and on the pad squeezer.

3. The ultrasound probe holding device as claimed in claim 1, wherein a surface of the head pad configured to be in contact with the head of the infant is curved to adapt to a shape of the head of the infant.

4. The ultrasound probe holding device as claimed in claim 3, wherein said curved surface has curvatures different in two perpendicular planes.

5. The ultrasound probe holding device as claimed in claim 1, wherein the device holder comprises a flexible material harness attached to the pad squeezer.

6. The ultrasound probe holding device as claimed in claim 1, wherein the device holder is configured to attach electrodes for electroencephalography.

7. The ultrasound probe holding device as claimed in claim 1, further comprising:
    a probe holder configured to receive an ultrasound probe, wherein said probe holder is fastened to the head pad.

8. The ultrasound probe holding device as claimed in claim 7, wherein the probe holder is removably fastened to the head pad.

9. The ultrasound probe holding device as claimed in claim 8, wherein the probe holder can be fastened to the head pad in at least two positions.

10. An ultrasound device for transfontanellar imaging of an infant, comprising:
    an ultrasound probe holding device as claimed in claim 1; and
    an ultrasound probe configured to be mounted in said head pad, wherein the ultrasound probe is configured to emit ultrasound waves towards a brain of the infant and receive backscattered ultrasound waves.

11. The ultrasound device as claimed in claim 10, wherein the ultrasound probe can be rotated around a rotation axis substantially perpendicular to said guidance axis.

12. The ultrasound device as claimed in claim 10, wherein the ultrasound probe can be rotated around a rotation axis substantially parallel to said guidance axis.

13. The ultrasound device as claimed in claim 10, wherein:
    said ultrasound probe holding device comprises a probe holder; and
    said ultrasound probe is configured to be removably fastened to said probe holder.

14. An ultrasound imaging system for transfontanellar imaging of an infant comprising:
    an ultrasound device as claimed in claim 10;
    an electronic module configured to receive electrical signals transmitted by the ultrasound probe and generate converted signals, wherein said electrical signals result from a detection of the backscattered ultrasound waves; and
    a computer configured to receive the converted signals from said electronic module and calculate imaging data from said converted signals.

15. A method for ultrasound brain imaging of an infant using the ultrasound imaging system of claim 14, comprising:
    positioning the head pad on the head of the infant;
    filling a cavity formed by the central opening of the head pad with an ultrasound gel;
    fastening the ultrasound probe on the head pad so that the ultrasound probe is in ultrasonic contact with a fontanel of the infant;
    positioning the pad squeezer to enable said axial guidance of the head pad along said guidance axis, wherein said guidance axis is substantially perpendicular to a surface tangent to the head of the infant;
    applying a downward force on the pad squeezer along said guidance axis, using said device holder; and
    emitting ultrasound waves and detecting backscattered ultrasound waves using the ultrasound probe for transfontanellar imaging.

16. The method as claimed in claim 15, further comprising:
    rotating the ultrasound probe around an axis substantially perpendicular to said guidance axis to image different tilted planes of the brain.

17. The method as claimed in claim 15, further comprising:
    rotating the ultrasound probe around an axis substantially parallel to said guidance axis from at least one first position to a second position in order to image coronal and sagittal sections of the brain.

18. The method as claimed in claim 15, further comprising:
    electroencephalographic measurements using electroencephalographic electrodes arranged on said device holder.

* * * * *